No. 850,456. PATENTED APR. 16, 1907.
R. D. ABRAHAM.
WEEDER.
APPLICATION FILED SEPT. 13, 1906.

Witnesses
E. K. Reichenbach.
James W. Quinn

Inventor
R. D. Abraham.
By Chandler & Chandler
Attorneys.

UNITED STATES PATENT OFFICE.

ROY D. ABRAHAM, OF DAYTON, WASHINGTON.

WEEDER.

No. 850,456.

Specification of Letters Patent.

Patented April 16, 1907.

Application filed September 13, 1906. Serial No. 334,534.

*To all whom it may concern:*

Be it known that I, ROY D. ABRAHAM, a citizen of the United States, residing at Dayton, in the county of Columbia, State of Washington, have invented certain new and useful Improvements in Weeders; and I do hereby declare the following to be a full, clear, and exact description of the invention, such as will enable others skilled in the art to which it appertains to make and use the same.

This invention has relation to weeding-machines that are adapted to be drawn by horses over the ground in a field and cut the weeds with which they come into contact.

The invention is useful in destroying weeds wherever they may grow, and it is particularly adapted for cutting weeds that spring up on "summer fallow - ground," which it is necessary to cut down or destroy before the ground can be properly prepared for seed-sowing.

The invention is clearly and fully illustrated in the annexed drawings, forming a part of this specification, in view of which it will be described in detail as to its construction and mode of operation and then be particularly pointed out in the subjoined claims.

Figure 1:
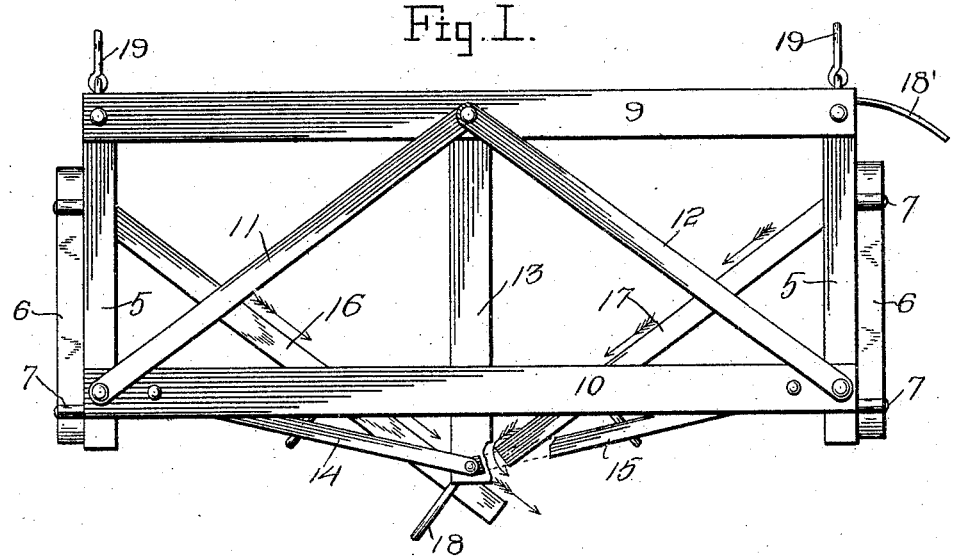
Figure 2:
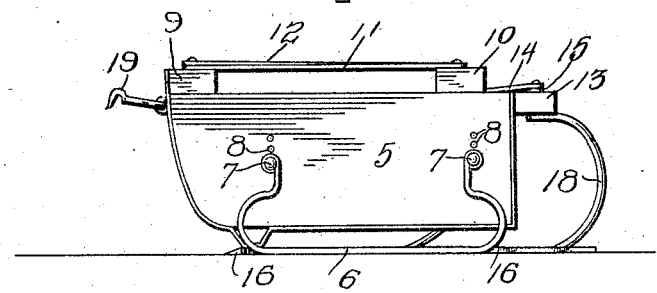

Of the said drawings, Figure 1 is a plan of a form of machine embodying the invention. Fig. 2 is a side view.

In the drawings, 5 designates the runners, which may be composed of wood, as shown, or they may be formed of steel or other suitable material. The said runners are provided with soles 6, that are curved upwardly at each end and then extend vertically and have their extremities formed into eyes, through which they are adjustably connected with the runners 5 by means of bolts 7, passing through the holes 8, formed through the sides of the runners, which have a vertical arrangement with respect to each other.

9 and 10 designate transverse bars secured, respectively, at the forward and rear ends of the runners to properly space the same and maintain them in the said position.

11 and 12 designate bars secured at their forward ends centrally upon the transverse bar 9 and at their rearward-diverging ends upon the bar 10 and the rear ends of the runner.

13 designates a longitudinal bar arranged under the bars 11 and 12 and secured thereto and extending at its rear end beyond the bar 10. Said bar 13 is arranged midway of the runners 5 and parallel therewith.

14 and 15 designate brace-bars secured at their inner ends to the upper rear end of the longitudinal bar 13 and at their outer ends under the transverse bar 10 near its outer ends.

The several bars mentioned are connected to each other and to the runners by bolts or other suitable means.

16 and 17 designate the weeder-blades, that are composed of steel and are beveled at their lower edges so as to be relatively sharp, in order to cut the weeds with which they come into contact. The blade 16 is quite long and extends from the front part of the left runner rearwardly and inwardly to a point beyond the rear transverse bar 10 and to the right of the longitudinal center of the machine. The other blade 17, which is shorter than the blade 16, extends from the right-hand runner inwardly and rearwardly to a point considerably short of meeting the blade 16, so that there is a considerable space between the rear end of the blade 17 and the blade 16, through which the weeds that are cut off may pass freely without any liability of clogging the machine. The blades are secured to the runners and have curved supports 18, connected with their rear ends and with the frame-bars to maintain them securely in place.

The soles 6 are rendered adjustable by means of the bolts 7 in the upper ends of their eyes, which bolts may be passed through either of the holes 8, as stated, in order to raise or lower the runners and so adjust the cutting-blades 16 and 17 near to or higher above the surface of the ground over which the machine travels.

18' designates a guard, consisting of a short curved rod connected with the forward end of one of the runners 5 and bent rearwardly, so as to push aside the standing weeds that the runners and their soles may not engage the same in standing position. The forward ends of the runners are furthermore provided with hooks 19, to which a doubletree or other draft means may be connected in order to draw the machine through the field.

The machine here shown is constructed partly of wood and partly of iron or steel, though it may be made entirely of steel, and the form of arrangement of parts may be varied from that shown within the limits of mechanical skill without departing from the general nature or spirit of the invention.

What is claimed as the invention is—

1. A weed-cutting machine embodying in its construction runners, a supporting-framework, a long cutting-blade connecting at its forward end with the forward end of a runner and extending diagonally across the longitudinal center of the machine to beyond the rear thereof, and a second cutting-blade connected at its forward end to the forward end of the other runner and extending diagonally inward and rearward toward the first-mentioned blade, but stopping short of it.

2. A weed-cutting machine embodying in its construction runners, a supporting-framework, a long cutting-blade connected at its forward end with the forward end of a runner and extending diagonally across the longitudinal center of the machine to beyond the rear thereof, and a second cutting-blade connected at its forward end to the forward end of the other runner and extending diagonally inward and rearward toward the first-mentioned blade, but stopping short of it, combined with a weed-guard connected with the runner on the side of the standing weeds, as set forth.

In testimony whereof I affix my signature in presence of two witnesses.

ROY D. ABRAHAM.

Witnesses:
F. M. BAUERS,
ED. M. DAVIS.